United States Patent [19]

Kuramoto et al.

[11] Patent Number: 4,610,864
[45] Date of Patent: Sep. 9, 1986

[54] METHOD OF CONTINUOUSLY PRODUCING POWDER OF SILICON COMPOUND USEFUL AS CERAMICS MATERIAL

[75] Inventors: Tohru Kuramoto; Toshiharu Miki; Kozo Nishino; Hiroshi Ono, all of Ube, Japan

[73] Assignee: Central Glass Company, Limited, Ube, Japan

[21] Appl. No.: 729,740

[22] Filed: May 2, 1985

[30] Foreign Application Priority Data

May 9, 1984 [JP] Japan .................. 59-91061

[51] Int. Cl.⁴ .......................................... C01B 21/063
[52] U.S. Cl. .................................................. 423/344
[58] Field of Search ........................................ 423/344

[56] References Cited

U.S. PATENT DOCUMENTS 4,525,335  6/1985  Tanaka ................................ 423/344

Primary Examiner—Peter D. Rosenberg
Attorney, Agent, or Firm—Fleit, Jacobson, Cohn & Price

[57] ABSTRACT

To efficiently produce a fine powder of silicon carbide or silicon nitride useful as engineering ceramics material, a granulated or pelleted mixture of silica powder and carbon powder is put into a plurality of containers each of which has ventilating means such as vent holes, and the containers are introduced into an upper section of a vertically extending heating zone in turn. In the heating zone a nonoxidizing gas atmosphere, which is a nitriding gas atmosphere when producing silicon nitride, is maintained at a temperature of 1400°–2100° C. The granulated or pelleted mixture in the containers undergoes reaction while each container is downwardly moved in the heating zone, either continuously or stepwise, so as to stay in the heating zone for a predetermined length of time.

20 Claims, 3 Drawing Figures

METHOD OF CONTINUOUSLY PRODUCING POWDER OF SILICON COMPOUND USEFUL AS CERAMICS MATERIAL

BACKGROUND OF THE INVENTION

Field of the Invention

This invention relates to a method of producing a silicon compound powder useful as the material of engineering ceramics, and more particularly to a method of continuously producing a powder of silicon carbide or silicon nitride by reduction of silica.

Recently a strong interest is shown in so-called engineering ceramics as substitutes for conventional heat-resistant metal materials with a view to saving energy and resources of rare metals. Among hitherto tested materials for such ceramics, carbon silicide or silicon carbide and trisilicon tetranitride are deemed especially promising and have been used in some engineering ceramics products already developed to the practical application stage.

The following reactions are representative of known methods for preparing silicon carbide or silicon nitride.

(A) Reaction of Elemental Silicon

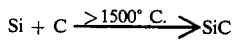  (1)

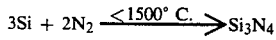  (2)

(B) Vapor Phase Reaction

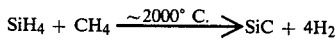  (3)

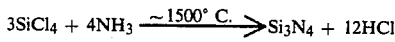  (4)

(C) Thermal Decomposition

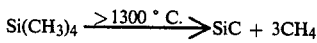  (5)

  (6)

(D) Carbothermic Reduction of Silica

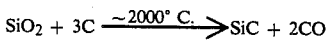  (7)

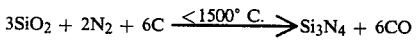  (8)

Silicon-containing nonoxide ceramics materials such as SiC and Si$_3$N$_4$ are not easy to sinter. Therefore, these materials must be prepared in very fine powder form with a mean particle size of about 1 micron or smaller. Besides, very high purity is required of these materials in view of the high temperature strength of the sintered ceramics. In general, a purity of 99.5% or above is required. From these points of view, the above classified production methods are evaluated as follows.

The method (A) is rather unfavorable for industrial practice because it is difficult to obtain the product in desirably fine powder form, and also because high purity silicon is a costly material. The vapor phase reaction method (B) provides very fine powders of high purity silicon carbide or silicon nitride, but the silicon compounds used in these reactions are costly and the yields of the intended compounds are low. Besides, in general it is difficult to produce crystalline silicon carbide or silicon nitride by these vapor phase reactions.

The thermal decomposition method (C) provides high purity products, but the starting silicon compounds are very costly.

The reduction method (D) is favorable for industrial practice because of using inexpensive silica as the primary material. However, this method cannot be deemed fully developed because the obtained powders are relatively coarse and also because the productivity is relatively low.

The silica reduction reactions of equations (7) and (8) are usually carried out batchwise. As a continuous process, it was proposed to carry out a moving bed type reaction in a vertical furnace using graphite as heating elements. However, this method involves various problems most of which are not easy to solve. First, the productivity does not become so high as is expected because the raw material needs to be subjected to reaction in the form of large granules or pellets (at least about 10 mm in diameter) to realize a moving bed and, therefore, must stay in the furnace for a considerably long time until completion of the reaction in the core region of each pellet. Second, it is inevitable that the distribution of temperature in the vertical furnace becomes nonuniform in the horizontal directions. This is unfavorable to the uniformity of the partial size of the product. The distribution of temperature may be made uniform by decreasing the diameter of the reaction tube, but this is contrary to the intention of developing an industrially practicable and efficient technique. Besides, various means and subsidiary apparatus must be devised to keep up continuous operation for a long period without suffering from deposition or fusion-adhesion of silicic scale onto the reaction apparatus. Also it is troublesome to finely pulverize the product obtained in the form of a coarse powder.

A more serious problem in the continuous production of silicon carbide or silicon nitride powder in a vertical furnance is a blocking or clogging phenomenon. In the above described method a column of the granulated or pelleted material moves downward in the furnace core tube made of graphite. As the reaction proceeds, some portions of the granules or pellets collapse and powder by the action of the deadweight thereof. As a result, an obstruction is offered to smooth downward movement of the reacting material and/or to uniform flow of the gas in the tube. In an extreme case, clogging of the tube with the collapsed material causes the material to blow up so that the operation can no longer be continued. Also it is a matter of disadvantage that silica in the raw material reacts with the graphite core tube too to result in early wear of the core tube.

Japanese patent application provisional publication No. 54-134100 (1979) and Japanese patent application publication No. 58-48487 (1983) propose to produce a powder of β-SiC by confining a powder mixture of silica and carbon in a cylindrical container made of high density graphite and externally heating the container while it is moved horizontally in a tubular furnace. This method can be practiced as a continuous process by using a plurality of containers without suffering from clogging of the reaction tube or the furnace. However, in this method it is impossible to discharge carbon monoxide gas formed by the reaction from the reaction system since the reaction system is confined in the closed container. The accumulation of carbon monoxide gas in the reaction system causes the rate of reaction to be gradually and significantly lowered. For this reason this method is not suited to industrial practice.

SUMMARY OF THE INVENTION

The present invention provides a method of efficiently producing a powder of a nonoxide silicon compound useful as a ceramics material, such as silicon carbide or silicon nitride, which method can be performed in a continuous manner by continuous operation of a heating apparatus for a sufficiently long period of time without unintentional interruption and can produce a fine powder of high purity.

This invention provides a method of producing a powder of a nonoxide silicon compound useful as a ceramics material, the method comprising the steps of putting a granulated or pelleted material comprising silica and carbon into a plurality of containers each of which has ventilating means, introducing the containers containing the aforementioned material into an upper section of a substantially vertically extending heating zone while a nonoxidizing gas atmosphere is maintained in the heating zone at a temperature in the range from 1400° to 2100° C., and downwardly moving each of the containers in the heating zone continuously or stepwise such that each of the containers stays in the heating zone for a predetermined period of time.

In this method, the nonoxidizing gas atmosphere and the heating temperature are selected depending on the kind of the silicon compound to be produced. To obtain a silicon carbide powder an inert gas may be used, and the heating temperature is 1400°-2100° C. To obtain a silicon nitride powder a nitriding gas such as nitrogen gas is used, and the heating temperature is 1400°-1600° C.

The particulars of the containers are not limited. For example, it is convenient to use lidded cylindrical containers made of graphite, which are formed with small diameter vent holes in the top and bottom walls and are shaped so as to rest one upon another in the longitudinal axial direction.

According to the invention the granulated or pelleted material, which is essentially a mixture of silica powder and carbon powder, is heated to undergo the reaction of the equation (7) or (8) in a state confined in a ventilative container. During heating the container is moved as stated above, but the reacting material does not move relative to the container. The total weight of the material in each container is relatively small compared with the case of directly charging the same material into a vertical reaction tube in a known continuous process. For these reasons the granules or pellets in the containers do not significantly collapse and powder during the heating process, and carbon monoxide gas formed by the reaction smoothly flows out of the containers through the vent holes. Accordingly the heating operation can be continued for a desirably long period of time without encountering the above described problem of clogging. In this method it is possible to use fine powders of silica and carbon as the raw materials, and it is easy to almost uniformly heat the granulated or pelleted material by suitably designing the shape and size of the containers. Therefore, it is possible to obtain a very fine powder of high purity silicon carbide or trisilicon tetranitride.

DESCRIPTION OF THE PREFERRED EMBODIMENTS

Preparatory to the heating operation, a fine powder of silica and a fine powder of carbon are well mixed in the proportion indicated in the equation (7) or (8), and the powder mixture is granulated or pelleted by a conventional method by using a suitable binding agent, such as sucrose or polyvinyl alcohol, that decomposes and gasifies at the temperature employed in the subsequent heating process. The physical strength of the prepared granules or pellets is not a matter of great importance since the granules or pellets are kept in the containers in the above described manner until completion of the reaction. The size of the granules or pellets, represented by diameter, is not specifically limited although a range from about 2 mm to about 20 mm is suitable to ensure smooth flow of gases through the granules or pellets packed in each container.

In this invention a preferred material of the containers is graphite. The containers may be of any size suited to the dimensions of the heating zone in the employed furnace. Though not limitative, it is convenient to use generally cylindrical containers closed at the bottom and lidded at the top. In that case, a very suitable range of the ratio of the effective length to inner diameter of each container is from about 0.5 to about 50. As the ventilating means it is usual to bore a plurality of vent holes through selected walls of the containers. In cylindrical containers, the vent holes may be axial holes and/or radial holes. Of course the diameter of each vent hole is made smaller than the minimum diameter of the granules or pellets to be heated, and it is desirable to form the vent holes at substantially uniform intervals.

The granulated or pelleted material in the containers is heated in an inert gas or in a nitriding gas, as mentioned hereinbefore, and the heating temperature is controlled as mentioned hereinbefore. When producing a powder of $\beta$-SiC in a nonoxidizing gas, a preferred range of the heating temperature is from 1650° to 1950° C. When producing a powder of $Si_3N_4$ in a nitriding gas, a preferred range of the heating temperature is from 1400° to 1550° C.

In the heating zone, the rate of downward movement of the containers may arbitrarily be determined with consideration of related factors such as the composition of the raw material mixture, heating temperature and the capacity of the containers.

Figure 1:
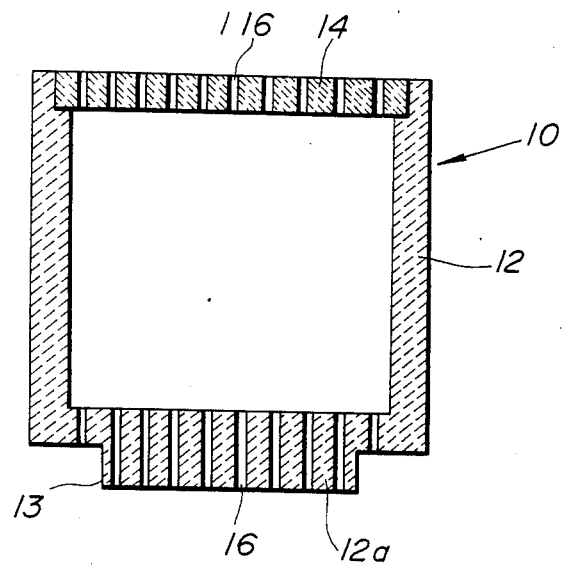
FIG. 1 is a longitudinal sectional view of a ventilative container for use in the present invention.

FIG. 1 shows an example of ventilative containers for use in the method according to the invention. The main material of this container 10 is graphite. The container 10 consists of a hollow cylindrical body 12 having a bottom wall 12a and a disc-shaped top lid 14 which can be opened and closed according to need. In a central and major area the bottom wall 12a projects downward so as to provide an annular shoulder 13 on the outer side of the bottom. A number of vertical vent holes 16 are bored through both the bottom wall 12a and the top lid 14 so that gases may flow in and flow out of the container 10. Every vent hole 16 is sufficiently small in diameter to prevent a granular material confined in the container 10 from falling out.

Figure 2:
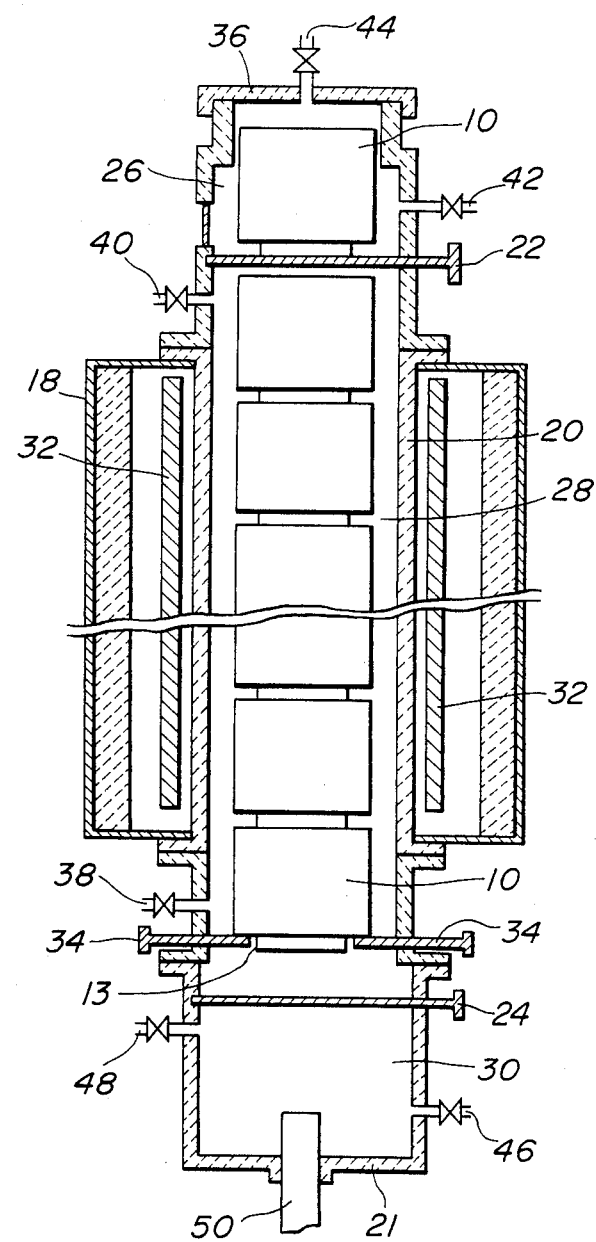
FIG. 2 is a schematic and longitudinal sectional view of a heating apparatus of use in the present invention.

FIG. 2 shows an example of heating apparatus used in the present invention. Essentially this apparatus is a combination of a cylindrical furnace 18 and a cylindrical reaction tube 20 which stands vertically to extend through the furnace 18. The principal material of the reaction tube is graphite. Upper and lower shutters 22 and 24 each of which can be opened and closed whenever desired divide the interior of the reaction tube 20 into three sections, viz. inlet section 26 at the top, heating zone 28 which occupies a major portion of the tube 20 and outlet section 30 at the bottom. The reaction tube 20 has a bottom wall 21, and a solid cylinder 50 of graphite is slidably fitted into a hole bored in the bottom wall 21 so as to vertically protrude into the outlet section 30. The furnace 18 has heating elements 32 arranged cylindrically around the heating zone 28 of the reaction tube 20. In the lowermost section of the heating zone 28 there are a pair of stoppers 34, which can be opened and closed whenever desired and provide a circular opening therebetween even when closed. The top opening of the reaction tube 20 can be closed by a detachable lid 36.

Preparatory to the heating operation, an empty container 10 of FIG. 1 is put into the reaction tube 20 to rest on the closed stoppers 34 with the shoulder 13 at the bottom loosely fitted in the aforementioned circular opening. Then, several empty containers 10 are put into the reaction tube 20 in turn so as to rest upon one another until the entire height of the heating zone 28 is occupied by the empty containers 10. After that the upper and lower shutters 22 and 24 are closed, and, in the case of producing a silicon carbide powder, a nonoxidizing gas is introduced into the heating zone 28 by opening a gas inlet 38. Indicated at 40 is a gas outlet to discharge unnecessary gases from the heating zone 28. Maintaining a nonoxidizing gas atmosphere in the heating zone 28, the heating elements 32 of the furnace 18 are energized so as to keep the heating zone 28 in the reaction tube 20 at a predetermined temperature.

To start the heating operation, a container 10 containing a granulated material to be heated is put into the inlet section 26 of the reaction tube 20 while the upper shutter 22 is kept closed. Then the lid 36 is closed, and air in the inlet section 26 is replaced by the nonoxidizing gas by using a gas inlet 42 and a gas outlet 44. Next, the lower shutter 24 and the stoppers 34 are opened to allow the lowermost empty container 10 to enter the outlet section 30. The slidably movable graphite cylinder 50 is used to support the container 10 downwardly moving into the outlet section 30. After that the lower shutter 24 and the stoppers 34 are again closed. As a natural consequence, the remaining empty containers 10 in the heating zone 28 move downward by the height of a single container 10 so that a space for another container 10 is left in the uppermost section of the heating zone 28. Then, the upper shutter 22 is opened to allow the charged container 10 in the inlet section 26 to enter the heating zone 28. The shutter 22 is again closed, and a next container 10 containing the granulated material is introduced into the inlet section 26. Meanwhile, the container 10 admitted into the outlet section 30 is taken out by opening a door (not shown) provided as a part of the side wall of this section 30. Air in the outlet section 30 can be replaced by a nonoxidizing gas by using the gas inlet 46 and a gas outlet 48.

The above procedure for the transfer of one container 10 from the heating zone 28 to the outlet section 30 and another container from the inlet section 26 to the heating zone 28 is sequentially repeated at such intervals that every container 10 charged with the granulated material stays in the heating zone 28 for a predetermined length of time. In the heating zone 28 the nonoxidizing gas can flows into each container 10 through the vent holes 16 in FIG. 1 and flows out together with a gaseous reaction product such as carbon monoxide. Such a gaseous reaction product is discharged from the heating zone 28 through the gas outlet 40. Thus, heating of the granulated material for the synthesis of desired silicon carbide is accomplished as a continuous process. In the case of synthesizing silicon nitride, nitrogen gas or ammonia gas is used in place of the aforementioned inert gas.

Figure 3:
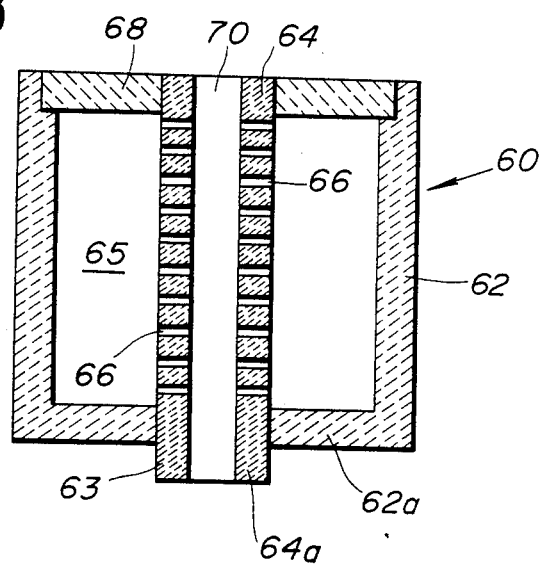
FIG. 3 is a longitudinal sectional view of another ventilative container for use in the present invention.

FIG. 3 shows another example of ventilative containers. The main material of this container 60 is graphite. This container 60 is made up of a cylindrical body 62 having a bottom wall 62a, a hollow cylinder 64 which is tightly fitted into a central hole in the bottom wall 62a and extends axially of the cylindrical body 62 to its open top end, and a detachable top lid 68 in the shape of an annular plate. A lower end portion 64a of the inner cylinder 64 protrudes from the bottom wall 62a so as to provide an annular shoulder 63 on the outer side of the bottom. The inner cylinder 64 is open at both ends, and a number of radial vent holes 66 are bored through this cylinder 64 so as to provide flow communication between the cross-sectionally annular interior 65 of the container 60 and the cylindrical space 70 in the inner cylinder 64.

The container 60 of FIG. 3 has some advantages over the container 10 of FIG. 1. Since every container used in the present invention is heated externally, the temperature in the container 10 of FIG. 1 is liable to become relatively low in a radially central region so that the reaction in that region may not proceed at the same rate as in the peripheral region. Furthermore, a gas generated in the central region may not so rapidly flow out of the container 10 as is desired. In the container 60 of FIG. 3 such problems become negligible since the reactants are absent in a radially central region. Furthermore, in the heating apparatus as shown in FIG. 2 the central spaces 70 in the containers 60 placed one upon another constitute a vertical tunnel or chimney through which the gas generated by the reaction flows upward. Naturally the deposition of scale on the inner surface of the reaction tube 20 extremely decreases and, therefore, the apparatus can continuously be operated for a very long period of time without need of intermediate inspection.

The invention will further be illustrated by the following nonlimitative examples.

EXAMPLES

Example 1

This example relates to the preparation of a silicon carbide powder.

First, 63 parts by weight of a silica sand powder having a mean particle size of 2 μm and 37 parts by weight of carbon black were uniformly mixed in dry state, and 20 parts by weight of sucrose, 1 part by weight of polyvinyl alcohol and 120 parts by weight of water were added to the powder mixture. The resultant wet mixture was kneaded and then shaped into granules of 5–15 mm diameters by an extruding machine, followed by drying.

The granulated material was charged in a plurality of cylindrical containers of the type shown in FIG. 1. The containers were made of graphite and had an inner diameter of 100 mm and an effective depth of 300 mm in the lidded state. The bottom wall of each container and the upper lid plate were formed with a number of uniformly spaced through-holes each having a diameter of 5 mm such that the total hole area was 30% of the cross-sectional inside area of the container. Use was made of a cylindrical reaction tube installed in a vertical type furnace in the manner as shown in FIG. 2. An argon gas atmosphere was maintained in the reaction tube, and the temperature in the central heating zone was kept at 1700° C. In this state, the containers charged with the granulated material were successively introduced into the heating zone via the top entrance section and allowed to downwardly move stepwise such that every container stayed in the heating zone for 10 hr.

The product of the reaction conducted thus was a very fine powder of a greenish gray color. By powder X-ray diffraction analysis this powder was confirmed to be mostly $\beta$-type SiC containing not the least amount of silica, and the purity of this $\beta$-SiC was as high as 99.9%, meaning that metallic impurities were less than 0.1%. In this product the primary particles of $\beta$-SiC had a mean particle size of about 0.2 $\mu$m.

The above described reaction apparatus was continuously operated for one month to carry out the silicon carbide forming reaction of Example 1, but the apparatus did not suffer from any trouble in a practical sense, although a small quantity of scale deposited on the cylindrical reaction tube wall defining the heating zone.

EXAMPLE 2

This example relates to the preparation of a silicon nitride powder.

Also in this example, the granulated material (fundamentally a mixture of silica and carbon) described in Example 1 and the apparatus mentioned in Example 1 were used. In this case, however, a nitrogen gas atmosphere was maintained in the reaction tube and the temperature in the heating zone was kept at 1450° C. The containers charged with the granulated material were allowed to downwardly move stepwise such that every container stayed for 11 hr in the heating zone.

The product of the reaction was a very fine powder of gray color. By powder X-ray diffraction analysis this powder was confirmed to be mostly $\alpha$-Si$_3$N$_4$ containing not the least amount of silica. In this product the primary particles of $\alpha$-Si$_3$N$_4$ had a mean particle size of 0.9 $\mu$m.

COMPARATIVE EXPERIMENT 1

In a reaction tube installed in a vertical type furnace, an argon gas atmosphere was maintained and the temperature in the heating zone was kept at 1700° C. In this state, the granulated material described in Example 1 was directly and continuously introduced into the reaction tube by the inlet at the top. In about 9 hr from the start of the reaction, collapsing and powdering of the granulated material due to its deadweight reached such an extent that the reaction tube was clogged with the partly powdered material. Nearly at the same time, a portion of the material in the reaction tube began to blow up, and it was no longer possible to continuously feed the granulated material into the reaction tube.

COMPARATIVE EXPERIMENT 2

The granulated material and the reaction apparatus were as mentioned in Comparative Experiment 1. In this case a nitrogen gas atmosphere was maintained in the reaction tube and the temperature in the heating zone was kept at 1450° C. In this state, the granulated material was directly and continuously introduced into the reaction tube by the inlet at the top. After the lapse of about 16 hr from the start of the reaction, continuous feed of the granulated material became impossible for the same reasons as in Comparative Experiment 1.

COMPARATIVE EXPERIMENT 3

The powder mixture of silica sand and carbon black mentioned in Example 1 was directly charged into a plurality of cylindrical containers made of graphite. That is, granulation of the powder mixture was not performed. The containers were of the shape shown in FIG. 1 and were of a completely closed type having no vent holes corresponding to the holes 16 in FIG. 1.

Using the apparatus mentioned in Example 1 and under the heating conditions mentioned in Example 1, the closed containers charged with the powder mixture were continuously introduced into the reaction tube and allowed to downwardly move stepwise such that every container stayed in the heating zone for 20 hr. As the result, a major portion of the powder mixture turned into silicon carbide. However, in every container a considerable amount of silica remained unreacted in a core region. Numerically, the powder after the reaction contained 11% of unreacted silica on the average.

EXAMPLE 3

This example relates to the preparation of a silicon carbide powder.

The granulated material described in Example 1 was charged in a plurality of containers of the type shown in FIG. 3. The containers were made of graphite and had an inner diameter of 100 mm and an effective depth of 300 mm in the lidded state. The tubular partition wall 64 disposed in the center of each container had an outer diameter of 35 mm and was formed with a number of uniformly spaced radial holes each having a diameter of 5 mm such that the total hole area was 30% of the cylindrical outer surface area of this partition.

Using the apparatus mentioned in Example 1 and under the same heating conditions as in Example 1, the granulated material in the containers was subjected to reaction in the continuous manner. In this case the containers in the reaction tube were moved such that every container stayed in the heating zone for 8 hr.

The product of the reaction was a very fine powder of a greenish gray color, which was confirmed to be mostly $\beta$-type SiC containing not the least amount of silica. The cation purity of this $\beta$-SiC was as high as 99.9%, and the primary particles of $\beta$-SiC had a mean particle size of about 0.2 $\mu$m.

The reaction apparatus was continuously operated for one month to carry out the silicon carbide forming reaction of Example 3, but the apparatus did not suffer from any trouble in a practical sense, although a very small quantity of scale deposited on the cylindrical reaction tube wall defining the heating zone. In this case, the deposition of scale was only about one third of the deposition in the case of Example 1.

What is claimed is:

1. A method of producing a powder of a nonoxide silicon compound useful as a ceramics material, the method comprising the steps of:
   putting a granulated or pelleted material comprising silica and carbon into a plurality of containers each of which has ventilating means;
   introducing said containers containing said material into an upper section of a substantially vertically extending heating zone in turn, while a nonoxidizing gas atmosphere is maintained in said heating zone at a temperature in the range from 1400° to 2100° C.; and
   downwardly moving each of said containers in said heating zone continuously or stepwise such that each of said containers stays in said heating zone for a predetermined period of time.

2. A method according to claim 1, wherein said silicon compound is silicon carbide and said nonoxidizing gas atmosphere comprises an inert gas atmosphere.

3. A method according to claim 2, wherein said temperature is in the range from 1650° to 1950° C.

4. A method according to claim 1, wherein said silicon compound is silicon nitride and said nonoxidizing gas atmosphere is a nitriding gas atmosphere.

5. A method according to claim 4, wherein said temperature is in the range from 1400° to 1600° C.

6. A method according to claim 5, wherein said temperature is in the range from 1400° to 1500° C.

7. A method according to claim 1, wherein the principal material of said containers is graphite.

8. A method according to claim 1, wherein said containers are of a generally cylindrical shape. and are longitudinal axially moved in said heating zone.

9. A method according to claim 8, wherein each of said containers has a bottom wall and a top lid, said ventilating means comprises a plurality of vent holes bored through said bottom wall and said top lid.

10. A method according to claim 8, wherein each of said containers comprises an outer cylindrical wall, a top lid, a bottom wall and an inner cylindrical wall which extends from said top lid to said bottom wall and has open ends at the top and bottom of the container, said ventilating means comprises a plurality of vent holes bored through said inner cylindrical wall.

11. A method according to claim 8, wherein said containers containing said material are placed one upon another in said heating zone.

12. The method of claim 1 wherein the material is placed in open-top containers.

13. The method of claim 1 where the nonoxide silicon compound is obtained in the form of a powder having a mean particle size of up to an including about one micron.

14. The process of claim 13 wherein the nonoxide silicon compound is obtained in the form of a powder having a mean particle size of up to and including about 0.9 microns.

15. The process of claim 13 wherein the nonoxide silicon compound is obtained in the form of a powder having a mean particle size of down to and including about 0.2 microns.

16. The process of claim 1 wherein the ventilating means occupy up to and including about 30% of the bottom side of each container.

17. The process of claim 9 wherein the vent holes comprise up to and including 30% of the bottom wall and the top lid.

18. The process of claim 10 wherein the vent holes comprise up to and including 30% of the bottom wall and the top lid.

19. The process of claim 1 wherein the nonoxide powder obtained contains not greater than or about 0.1% of impurities.

20. A method for producing a powder of a nonoxide silicon compound useful as a ceramics material, consisting of:
   placing a granulated or pelleted material comprising silica and carbon into a plurality of containers each of which has ventilating means;
   introducing said containers containing said material into an upper section of a substantially vertically extending heating zone in turn, while a nonoxidizing gas atmosphere is maintained in said heating zone at a temperature in the range from 1400° to 2100° C.; and
   downwardly moving each of said containers in said heating zone continuously or stepwise such that each of said containers stays in said heating zone for a predetermined period of time.

* * * * *